US012589706B2

(12) United States Patent
Takahashi et al.

(10) Patent No.: US 12,589,706 B2
(45) Date of Patent: Mar. 31, 2026

(54) GROMMET AND GROMMET ATTACHMENT STRUCTURE

(71) Applicants: Nifco Inc., Yokosuka (JP); Subaru Corporation, Tokyo (JP)

(72) Inventors: Shohei Takahashi, Yokosuka (JP); Satoshi Kanou, Tokyo (JP)

(73) Assignees: Nifco Inc., Yokosuka (JP); Subaru Corporation, Tokyo (JP)

( * ) Notice: Subject to any disclaimer, the term of this patent is extended or adjusted under 35 U.S.C. 154(b) by 245 days.

(21) Appl. No.: 18/378,674

(22) Filed: Oct. 11, 2023

(65) Prior Publication Data

US 2024/0123922 A1 Apr. 18, 2024

(30) Foreign Application Priority Data

Oct. 12, 2022 (JP) ................................. 2022-164357

(51) Int. Cl.
*B60R 16/02* (2006.01)
(52) U.S. Cl.
CPC ................................ *B60R 16/0222* (2013.01)

(58) Field of Classification Search
CPC .............................. B60R 16/0222; H02G 3/22
See application file for complete search history.

(56) References Cited

U.S. PATENT DOCUMENTS 6,010,134 A * 1/2000 Katoh ................. B60R 16/0222
174/152 G

FOREIGN PATENT DOCUMENTS

JP 2013225957 A * 10/2013
JP 2020-120540 8/2020
JP 2020120540 A * 8/2020
JP 2022130819 A * 9/2022

* cited by examiner

*Primary Examiner* — Timothy J Thompson
*Assistant Examiner* — Amol H Patel

(57) ABSTRACT

A grommet includes: a pair of clamping bodies that clamp a wire harness; a hinge portion that openably and closably couples the pair of clamping bodies; and an engagement portion that is provided at the pair of clamping bodies and that engages with an attachment hole formed in an attachment panel in a state in which the wire harness and the hinge portion clamped by the pair of clamping bodies are inserted into the attachment hole.

13 Claims, 14 Drawing Sheets

30

64(60)

32

34A(34)

36

34B(34)

50

42

44B(44)

44A(44)

46

62(60)

90

36

32

GROMMET AND GROMMET ATTACHMENT STRUCTURE

CROSS-REFERENCE TO RELATED APPLICATIONS

This application claims the benefit of priority of Japanese Patent Application No. 2022-164357 filed on Oct. 12, 2022, the contents of which are incorporated by reference as if fully set forth herein in their entirety.

TECHNICAL FIELD

The present disclosure relates to a grommet and a grommet attachment structure.

RELATED ART

Japanese Patent Application Laid-Open (JP-A) No. 2020-120540 discloses a grommet that attaches a wire harness to a through hole of a panel member by clamping the wire harness between clamping bodies. In the grommet, a hinge cover for protecting a hinge portion is provided at the hinge portion connecting the clamping bodies.

In the meanwhile, in the grommet disclosed in JP-A No. 2020-120540, in a case where the hinge cover is damaged, there is a concern that the hinge portion is exposed. In a case where the hinge portion is exposed, a flying stone during traveling of an automobile may hit the hinge portion, and the hinge portion may be damaged.

SUMMARY

In view of the above fact, an object of the disclosure is to suppress damage to a hinge portion in a grommet attached to an attachment hole of an attachment panel in a state in which a wire harness is clamped.

A grommet according to a first aspect of the disclosure includes: a pair of clamping bodies that clamp a wire harness; a hinge portion that openably and closably couples the pair of clamping bodies; and an engagement portion that is provided at the pair of clamping bodies and that engages with an attachment hole formed in an attachment panel in a state in which the wire harness and the hinge portion clamped by the pair of clamping bodies are inserted into the attachment hole.

In the grommet of the first aspect, the grommet of the first aspect is attached to the attachment panel by engaging the engagement portion with the attachment hole in a state in which the wire harness and the hinge portion clamped by the pair of clamping bodies are inserted into the attachment hole. In a state in which the grommet is attached to the attachment panel as described above, the hinge portion is located on a back surface side of the attachment panel. Therefore, according to the grommet of the first aspect, it is possible to suppress damage to the hinge portion due to an external force as compared with a conventional structure in which the hinge portion is located on a front surface side of the attachment panel.

A grommet according to a second aspect of the disclosure is the grommet according to the first aspect, in which the hinge portion includes a shaft portion of one clamping body of the clamping bodies, and a bearing portion that is included in another clamping body of the clamping bodies and that receives the shaft portion.

In the conventional structure, since the pair of clamping bodies is opened and closed by elastic deformation of the hinge portion coupling the pair of clamping bodies, the hinge portion is formed of a resin material that is easily elastically deformed. In a case where the hinge portion is formed of such a resin material, the hinge portion may be damaged by repeated opening and closing. On the other hand, in the grommet of the second aspect, the hinge portion is configured by the shaft portion included in the one clamping body and the bearing portion included in the other clamping body, and the pair of clamping bodies is openably and closably coupled by receiving the shaft portion of one clamping body by the bearing portion of the other clamping body. Therefore, in the grommet described above, as compared with the conventional structure, damage to the hinge portion can be suppressed even when the pair of clamping bodies is repeatedly opened and closed.

A grommet according to a third aspect of the disclosure is the grommet according to the second aspect, in which the one clamping body and the shaft portion are integral with each other, and the other clamping body and the bearing portion are integral with each other.

In the grommet of the third aspect, since the one clamping body and the shaft portion are integral with each other, and the other clamping body and the bearing portion are integral with each other, the number of parts can be reduced as compared with a configuration in which the pair of clamping bodies and the hinge portion are separated, for example.

A grommet according to a fourth aspect of the disclosure is the grommet according to the second aspect or the third aspect, in which the one clamping body includes a plate portion and a pair of shaft portions protruding in a thickness direction from both plate surfaces of the plate portion, the other clamping body includes a pair of bearing portions that are disposed on both sides of the plate portion in the thickness direction and that receive the pair of shaft portions, and at least a part of an outer peripheral surface of the plate portion is located at a same position as, or at a position protruding from, an outer peripheral surface of the bearing portions at end portions of the pair of clamping bodies on a side of a direction of insertion into the attachment hole.

In the grommet of the fourth aspect, in the hinge portion, at least a part of the outer peripheral surface of the plate portion is located at the same position as or at a position protruding from the outer peripheral surface of the bearing portions, so that it is possible to suppress the inside of the bearing portions from hitting an edge portion of the attachment hole when the hinge portion is inserted into the attachment hole of the attachment panel, for example, as compared with a configuration in which the outer peripheral surface of the plate portion as the hinge portion is located inside the outer peripheral surface of the bearing portions. Accordingly, it is possible to suppress damage to the hinge portion when the grommet is attached to the attachment panel.

A grommet according to a fifth aspect of the disclosure is the grommet according to the second aspect or the third aspect, in which the one clamping body includes a plate portion and a pair of shaft portions protruding in a thickness direction from both plate surfaces of the plate portion, the other clamping body includes a pair of bearing portions that are disposed on both sides of the plate portion in the thickness direction and that receive the pair of shaft portions, and edge portions of the pair of bearing portions are coupled to each other by a coupling portion at end portions of the pair of clamping bodies on a side of a direction of insertion into the attachment hole.

In the grommet of the fifth aspect, since the edge portions of the pair of bearing portions are coupled to each other by the coupling portion in the hinge portion, for example, as compared with a configuration in which the edge portions of the pair of bearing portions are not coupled to each other by the coupling portion, when the hinge portion is inserted into the attachment hole of the attachment panel, it is possible to suppress the inside of the bearing portions from hitting an edge portion of the attachment hole. Accordingly, it is possible to suppress damage to the hinge portion when the grommet is attached to the attachment panel.

A grommet according to a sixth aspect of the disclosure is the grommet according to any one of the first to fifth aspects, in which the clamping bodies and the engagement portion are integrated, and the engagement portion is elastically engaged with an edge portion of the attachment hole.

In the grommet of the sixth aspect, since the clamping bodies and the engagement portion are integrated, the number of parts can be reduced as compared with a configuration in which the clamping bodies and the engagement portion are separated, for example.

Furthermore, in the grommet, since the engagement portion is elastically engaged with the edge portion of the attachment hole, a modesty feeling can be obtained when the pair of clamping bodies are inserted into the attachment hole. That is, it is possible to recognize that the engagement portion is engaged with the edge portion of the attachment hole by an elastic force (a repulsive force) when the engagement portion is engaged with the edge portion of the attachment hole.

A grommet according to a seventh aspect of the disclosure is the grommet according to any one of the first to sixth aspects, in which the pair of clamping bodies are provided with an insertion prevention portion that is brought into contact with an edge portion of the attachment hole, on a side opposite from the engagement portion, across an edge portion of the attachment hole, in a state in which the pair of clamping bodies are inserted into the attachment hole.

In the grommet according to the seventh aspect, since the pair of clamping bodies are provided with the insertion prevention portion, the insertion prevention portion is brought in contact with the edge of the attachment hole of the attachment panel, and thereby, it is possible to suppress the pair of clamping bodies from being excessively inserted into the attachment hole.

Furthermore, in a state in which the pair of clamping bodies are inserted into the attachment hole, the edge portion of the attachment hole is sandwiched between the engagement portion and the insertion prevention portion, so that rattling of the pair of clamping bodies can be suppressed.

A grommet according to an eighth aspect of the disclosure is the grommet according to any one of the first to seventh aspects, in which the pair of clamping bodies include a holding portion that accommodates and holds the wire harness in a closed state.

In the grommet of the eighth aspect, when the pair of clamping bodies is closed, the wire harness is accommodated and held in the holding portion. Thus, in the grommet, the holding portion can suppress damage to the wire harness.

A grommet according to a ninth aspect of the disclosure is the grommet according to the eighth aspect, in which the holding portion is inserted through the attachment hole in a state in which the pair of clamping bodies are inserted into the attachment hole.

In the grommet of the ninth aspect, since the holding portion is inserted through the attachment hole in a state in which the pair of clamping bodies are inserted into the attachment hole, it is possible to suppress the wire harness from coming into contact with the edge portion of the attachment hole.

A grommet according to a tenth aspect of the disclosure is the grommet according to the ninth aspect, in which a longitudinal direction of the holding portion is inclined with respect to a hole axis direction of the attachment hole in a state in which the pair of clamping bodies are inserted into the attachment hole.

In the grommet of the tenth aspect, since the longitudinal direction of the holding portion is inclined with respect to the hole axis direction of the attachment hole, for example, as compared with a configuration in which the longitudinal direction of the holding portion and the hole axis direction of the attachment hole coincide with each other, an amount (protrusion height) by which the wire harness protrudes from the attachment panel is reduced, and damage to the wire harness due to an external force can be suppressed. Furthermore, handling of the wire harness is improved.

A grommet according to an eleventh aspect of the disclosure is the grommet according to any one of the first to tenth aspects, further including: a first locking portion provided at one clamping body of the clamping bodies; and a second locking portion that is provided at another clamping body of the clamping bodies and to which the first locking portion is locked, in which the first locking portion and the second locking portion are locked in a state in which the pair of clamping bodies are opened.

In the grommet of the eleventh aspect, the first locking portion and the second locking portion are locked in a state in which the pair of clamping bodies is opened, that is, a state where the pair of clamping bodies is opened is maintained by locking the first locking portion and the second locking portion. As described above, according to the grommet, the pair of clamping bodies can be conveyed in the state where the pair of clamping bodies is opened.

A grommet according to a twelfth aspect of the disclosure is the grommet according to any one of the first to eleventh aspects, in which the attachment panel is a vehicle body panel.

In the grommet of the twelfth aspect, since the attachment panel is a vehicle body panel, the grommet is attached to the vehicle body panel. In a state in which the grommet is attached to the vehicle body panel as described above, the hinge portion is located on a back surface side of the vehicle body panel. Therefore, according to the grommet described above, it is possible to suppress a flying stone from hitting the hinge portion during traveling of an automobile, as compared with the case where the hinge portion is located on a front surface side of the attachment panel as in the conventional structure. That is, it is possible to suppress damage to the hinge portion due to an external force.

A grommet attachment structure according to a thirteenth aspect includes: an attachment panel in which an attachment hole is formed; and a grommet including: a pair of clamping bodies that clamp a wire harness; a hinge portion that openably and closably couples the pair of clamping bodies; and an engagement portion that is provided at the pair of clamping bodies and that engages with the attachment hole formed in the attachment panel in a state in which the wire harness and the hinge portion clamped by the pair of clamping bodies are inserted into the attachment hole.

In the grommet attachment structure of the thirteenth aspect, in a state in which the wire harness and the hinge portion clamped by the pair of clamping bodies are inserted into the attachment hole, the engagement portion is engaged with the attachment hole, and the grommet is attached to the attachment panel. In a state in which the grommet is attached to the attachment panel as described above, the hinge portion is located on a back surface side of the attachment panel. Therefore, according to the grommet attachment structure of the thirteenth aspect, as compared with the conventional structure in which the hinge portion of the grommet is located on a front surface side of the attachment panel, damage to the hinge portion due to an external force can be suppressed.

According to the disclosure, in the grommet attached to the attachment hole of the attachment panel in a state in which the wire harness is clamped, damage to the hinge portion can be suppressed.

BRIEF DESCRIPTION OF THE DRAWINGS

Exemplary embodiments of the present invention will be described in detail based on the following figures, wherein.

DETAILED DESCRIPTION

Next, a grommet and a grommet attachment structure according to an embodiment of the disclosure will be described with reference to the drawings.

<Grommet 30>

As illustrated in FIGS. 1 to 14, a grommet 30 of the present embodiment is a component attached to an attachment hole 102 formed in an attachment panel 100 in a state of holding a wire harness 90. Examples of the attachment panel 100 of the present embodiment include a vehicle body panel (that is, a panel member used for a vehicle body) and the like. Note that the disclosure is not limited to this configuration. The attachment panel 100 may be a panel member other than the vehicle body panel.

Figure 1:
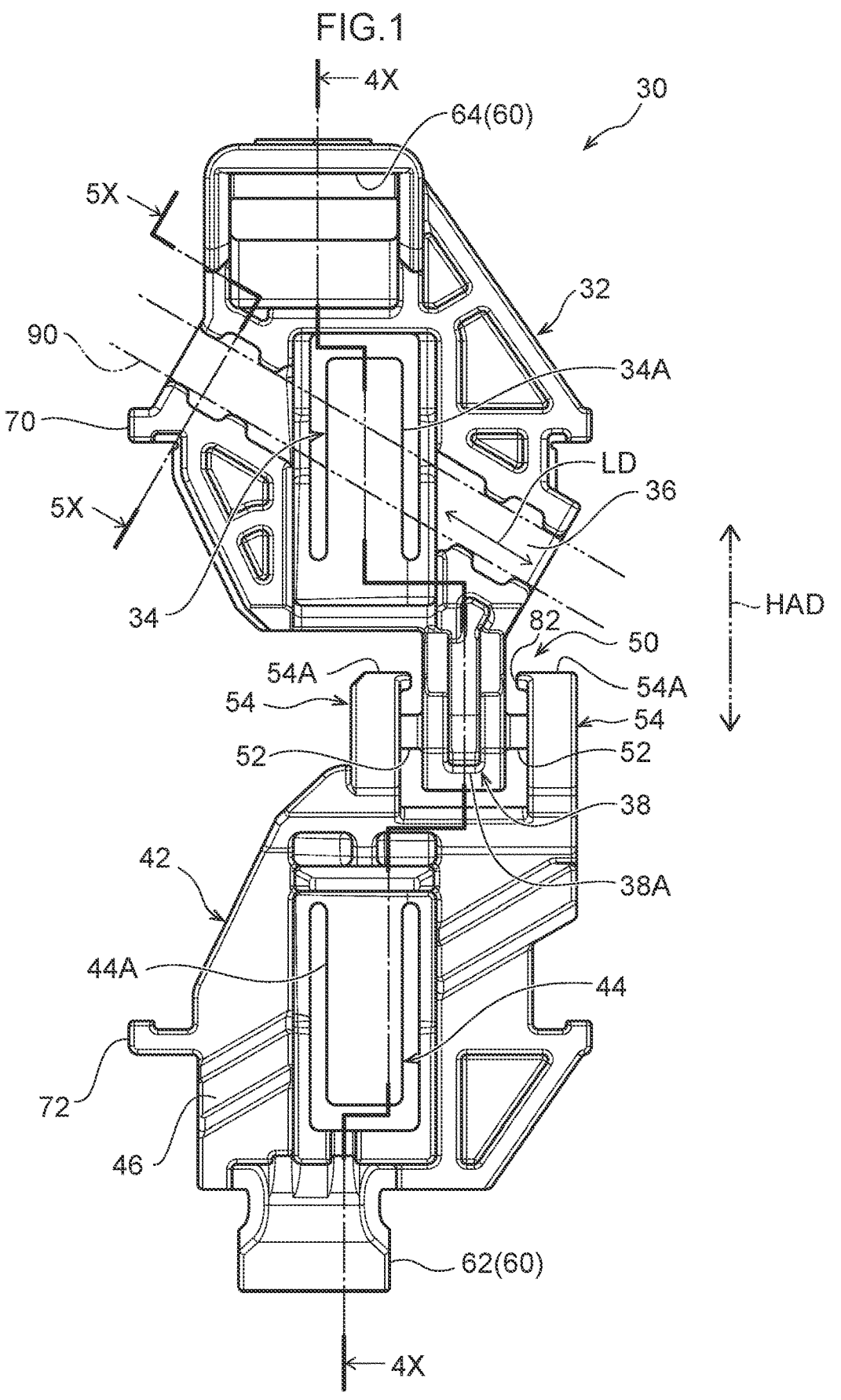
FIG. 1 is a plan view of a pair of clamping bodies as viewed from a clamping surface side in a state in which the pair of clamping bodies constituting a grommet according to an embodiment of the disclosure is opened.
Figure 2:
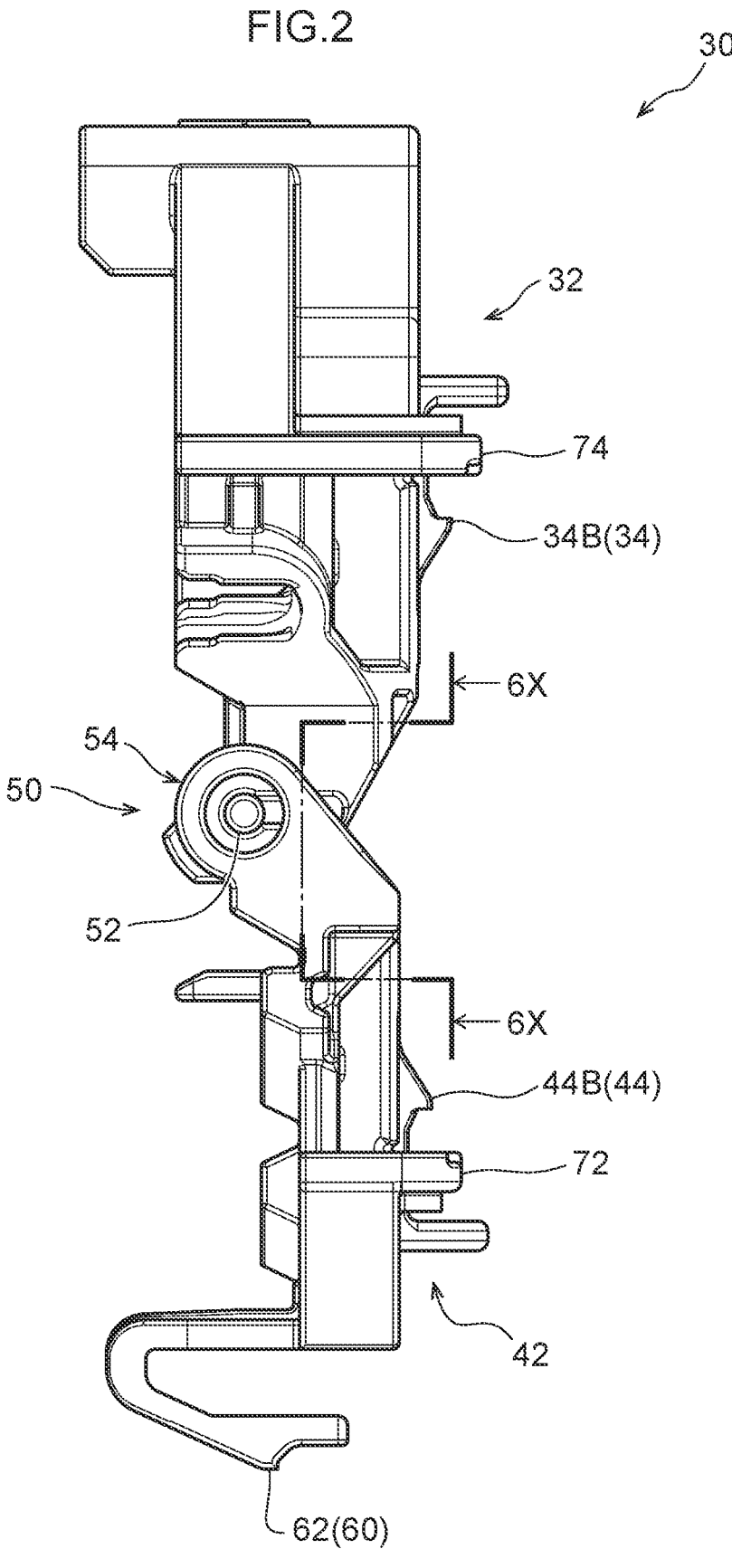
FIG. 2 is a side view of the grommet illustrated in FIG. 1.
Figure 3:
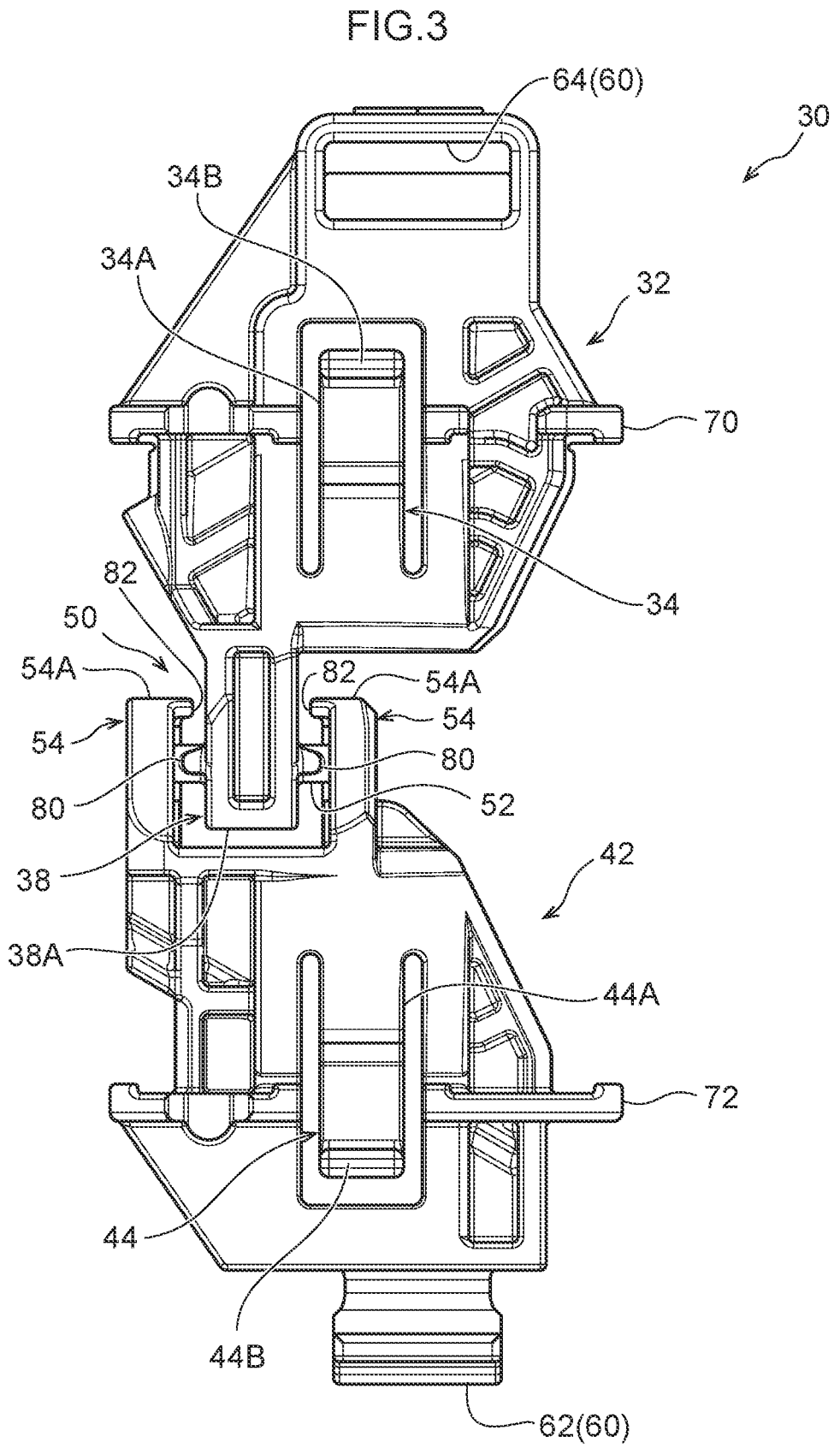
FIG. 3 is a plan view of the grommet illustrated in FIG. 1 as viewed from an opposite side (a side opposite from clamping surfaces of the pair of clamping bodies)

As illustrated in FIGS. 1 to 3, the grommet 30 includes a pair of clamping bodies 32 and 42, a hinge portion 50, and engagement portions 34 and 44.

(Pair of Clamping Bodies 32 and 42)

As illustrated in FIGS. 1 and 2, the pair of clamping bodies 32 and 42 is a member capable of clamping the wire harness 90. Specifically, the pair of clamping bodies 32 and 42 is openably and closably coupled by the hinge portion 50, and the wire harness 90 can be clamped from both sides in a closed state.

As illustrated in FIGS. 1 and 2, one end portions of the pair of clamping bodies 32 and 42 of the present embodiment in a longitudinal direction are coupled to each other by the hinge portion 50. On the other hand, the other end portions in the longitudinal direction of the pair of clamping bodies 32 and 42 are locked by lock portions 60. Specifically, the pair of clamping bodies 32 and 42 is maintained in a closed state by locking between a locking claw 62 and a hook portion 64 provided at the respective other end portions in the longitudinal direction. More specifically, the hook portion 64 is formed at the other end portion in the longitudinal direction of one clamping body 32, and the locking claw 62 that is elastically locked (elastically caught) to the hook portion 64 is formed at the other end portion in the longitudinal direction of the other clamping body 42.

Note that, in the following description, a state in which the pair of clamping bodies 32 and 42 is closed refers to a state in which the pair of clamping bodies 32 and 42 is maintained in the closed state, that is, a state in which the pair of clamping bodies 32 and 42 is locked by the lock portions 60.

Figure 7:
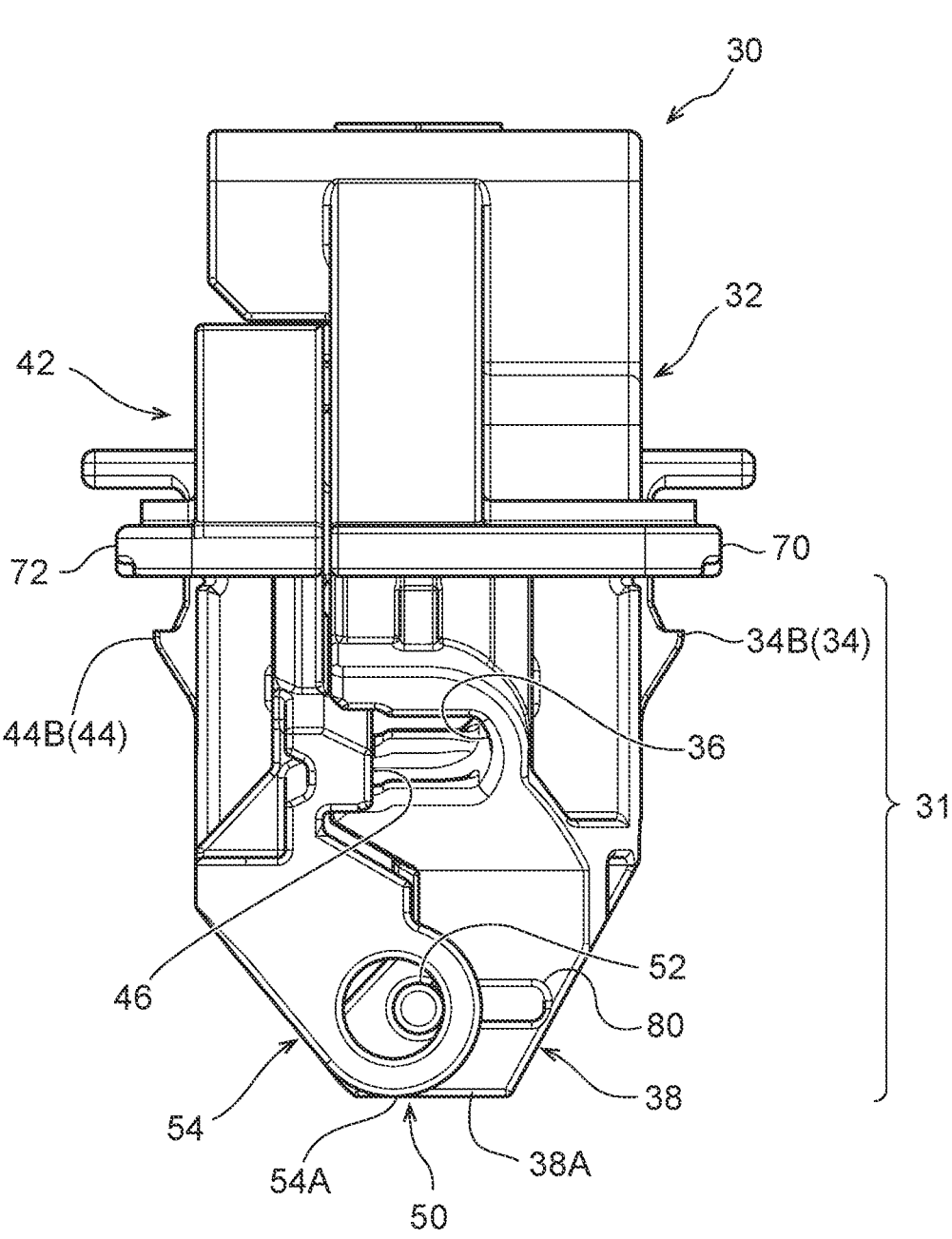
FIG. 7 is a side view in a state in which the pair of clamping bodies constituting the grommet according to the embodiment of the disclosure is closed.
Figure 8:
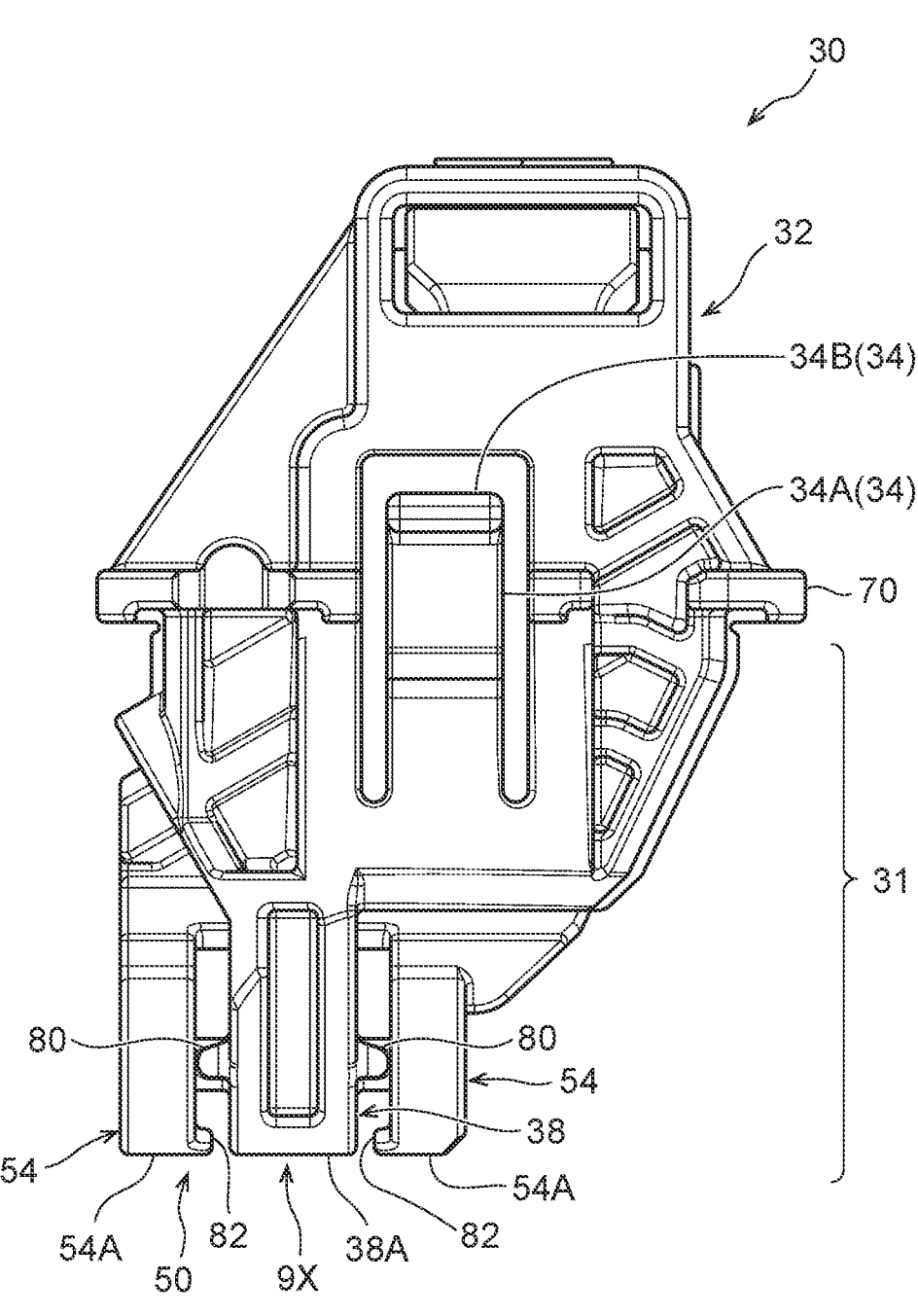
FIG. 8 is a plan view of the pair of clamping bodies constituting the grommet according to the embodiment of the disclosure as viewed from one clamping body side in a closed state.

Furthermore, as illustrated in FIGS. 7 and 8, the pair of clamping bodies 32 and 42 includes holding portions 36 and 46 that accommodate and hold the wire harness 90 in a closed state. Specifically, the holding portion 36 is formed on a clamping surface side of the clamping body 32. The holding portion 36 is a groove-shaped portion and has a size capable of accommodating the wire harness 90. Furthermore, a bottom surface of the holding portion 36 is a curved surface curved in an arc shape. On the other hand, the holding portion 46 is formed on a clamping surface side of the clamping body 42. The holding portion 46 is a portion that closes an opening (opening of a groove) of the holding portion 36. In a state in which the pair of clamping bodies 32 and 42 is closed, the holding portion 46 closes the opening of the holding portion 36 in which the wire harness 90 is accommodated, so that the wire harness 90 is held by the holding portions 36 and 46. Furthermore, since the bottom surface of the holding portion 36 is a curved surface, damage to the wire harness 90 can be suppressed.

Figure 5:
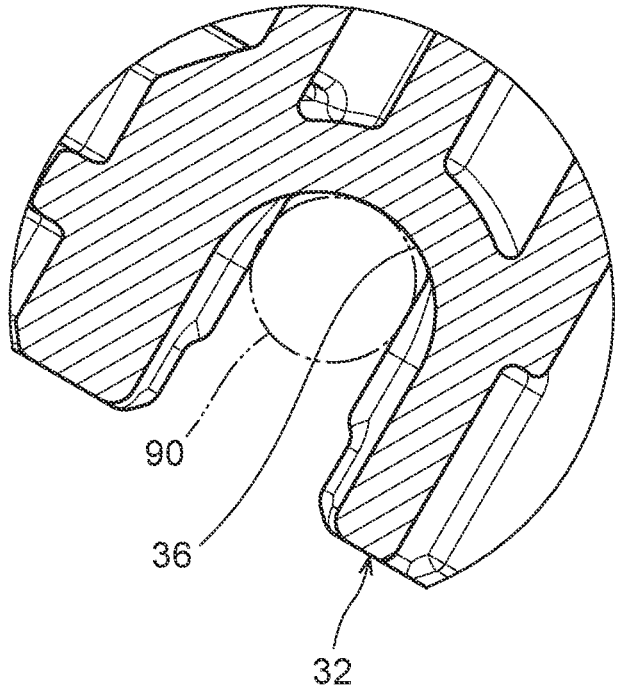
FIG. 5 is a cross-sectional view taken along line 5X-5X of FIG. 1.

Furthermore, as illustrated in FIGS. 1 and 5, the holding portions 36 and 46 are inserted through the attachment hole 102 in a state in which the pair of clamping bodies 32 and 42 is inserted into the attachment hole 102. That is, the groove-shaped holding portion 36 is inserted into the attachment hole 102. In other words, one end (that is, one end in the longitudinal direction of the groove) of the holding portion 36 in the longitudinal direction is located outside the opening on one side of the attachment hole 102, and the other end (that is, the other end in the longitudinal direction of the groove) in the longitudinal direction is located outside the opening on the other side of the attachment hole 102.

Note that, in the following description, a state in which the pair of clamping bodies 32 and 42 is inserted into the attachment hole 102 refers to a state in which the pair of clamping bodies 32 and 42 is inserted into the attachment hole 102 and the engagement portions 34 and 44 are engaged with the attachment hole 102. Furthermore, a reference sign ID in the drawing indicates an insertion direction of the grommet 30.

Furthermore, as illustrated in FIG. 1, a longitudinal direction LD of the holding portion 36 is inclined with respect to a hole axis direction HAD of the attachment hole 102 in a state in which the pair of clamping bodies 32 and 42 is inserted into the attachment hole 102.

(Hinge Portion 50)

As illustrated in FIGS. 1 to 3, the hinge portion 50 is a portion that openably and closably couples the pair of clamping bodies 32 and 42.

Figure 6:
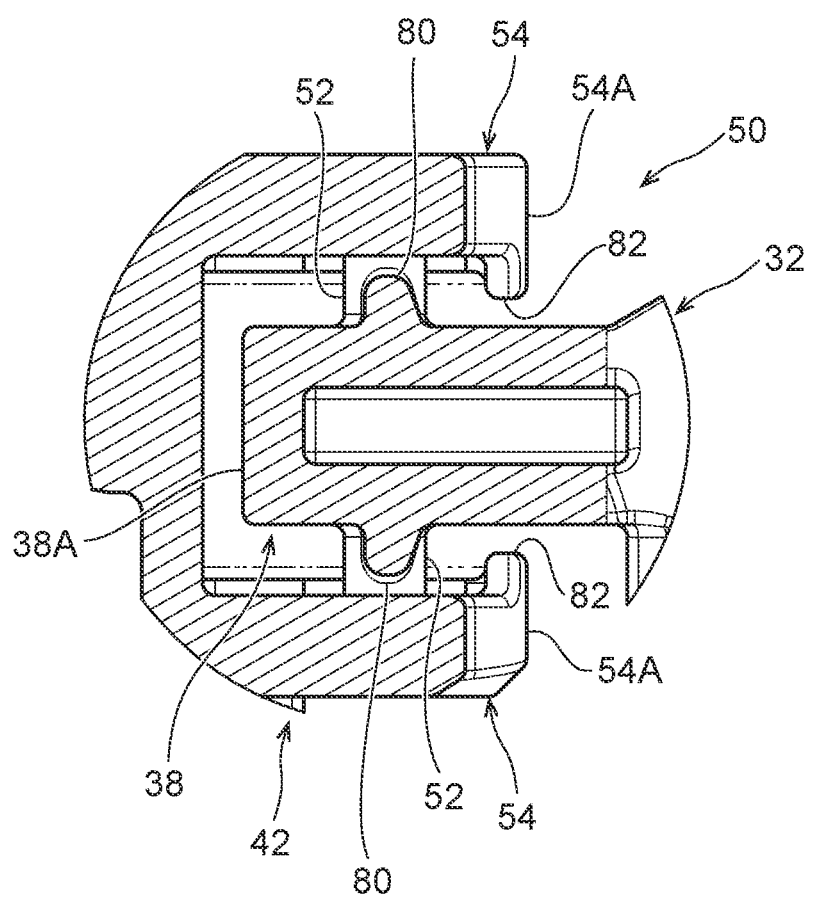
FIG. 6 is a cross-sectional view taken along line 6X-6X of FIG. 2.
Figure 9:
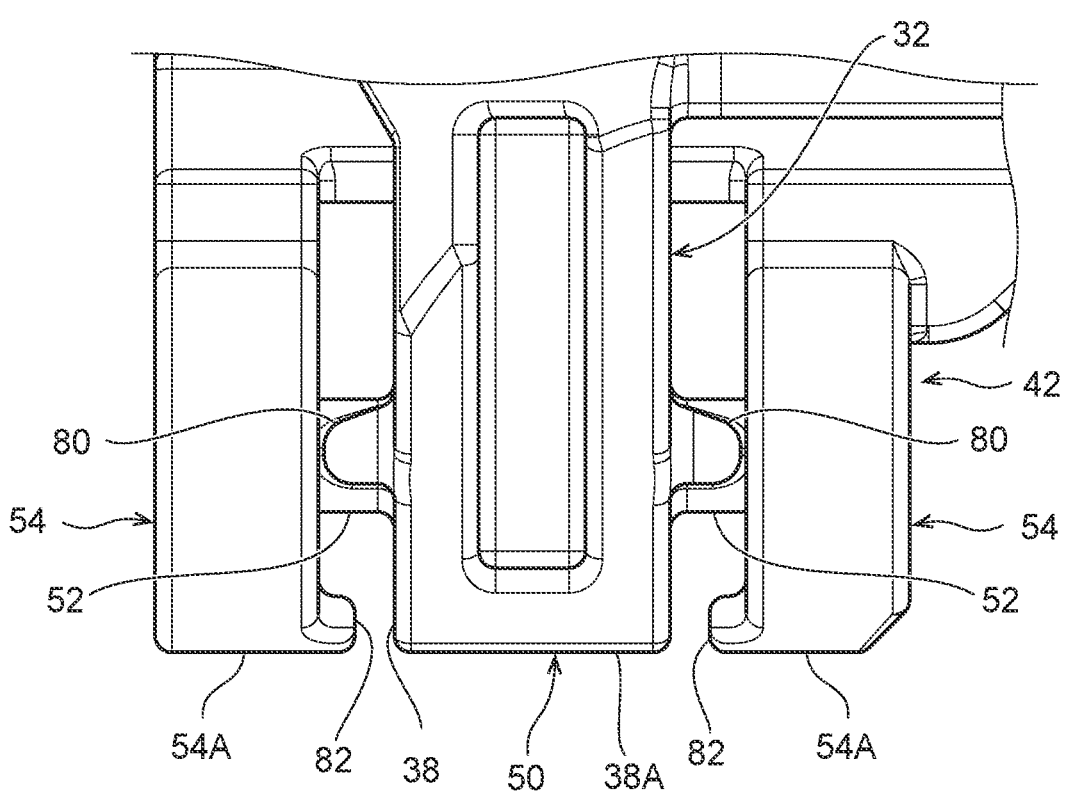
FIG. 9 is an enlarged view of a portion indicated by arrow 9X in FIG. 8.

As illustrated in FIGS. 6, 8, and 9, the hinge portion 50 includes a shaft portion 52 included in the clamping body 32 and a bearing portion 54 included in the clamping body 42 and receiving the shaft portion 52. Specifically, the clamping body 32 includes a plate portion 38 and a pair of shaft portions 52 protruding in a plate thickness direction from both plate surfaces of the plate portion 38. More specifically, the pair of cylindrical shaft portions 52 protruding in the plate thickness direction is provided at the plate portion 38 constituting one end portion of the clamping body 32 in the longitudinal direction.

Furthermore, the clamping body 32 and the pair of shaft portions 52 are integrated. Specifically, the clamping body 32 and the pair of shaft portions 52 are integrally molded.

The clamping body 42 includes a pair of bearing portions 54 that are disposed on both sides of the plate portion 38 in the plate thickness direction and that receive the pair of shaft portions 52. More specifically, the pair of bearing portions 54 are annular portions respectively provided at one end portions of the clamping body 42 in the longitudinal direction, and the shaft portion 52 is inserted into the inner hollow portion to rotatably support the shaft portion 52.

Furthermore, the clamping body 42 and the pair of bearing portions 54 are integrated. Specifically, the clamping body 42 and the pair of bearing portions 54 are integrally molded.

Figure 4:
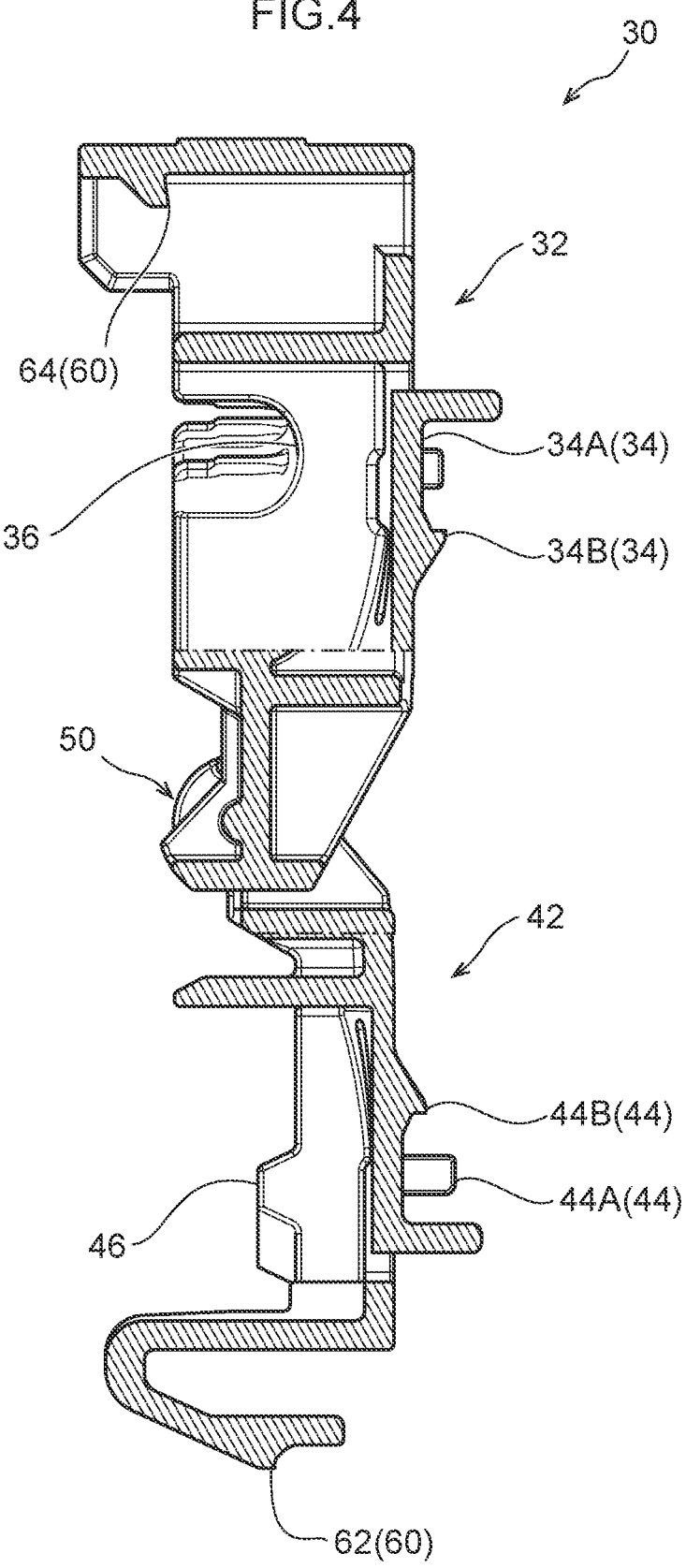
FIG. 4 is a cross-sectional view taken along line 4X-4X of FIG. 1.

As illustrated in FIGS. 4 and 6, in the hinge portion 50, at least a part of an outer peripheral surface 38A of the plate portion 38 is located at the same position as or at a protrusion position from an outer peripheral surface 54A of the bearing portion 54. In the present embodiment, when viewed from a rotation axis direction of the hinge portion 50, that is, an axial direction of the shaft portion 52, a part of the outer peripheral surface 38A (the end portion on the insertion direction side of the grommet 30) is at the same position as the outer peripheral surface 54A of the bearing portion 54.

(Engagement Portions 34 and 44)

As illustrated in FIGS. 2 and 4, the engagement portions 34 and 44 engage with the attachment hole 102 to attach the pair of clamping bodies 32 and 34 to the attachment hole 102.

The engagement portions 34 and 44 are provided at the pair of clamping bodies 32 and 34. Furthermore, the engagement portions 34 and 44 engage with the attachment hole 102 in a state in which the wire harness 90 and the hinge portion 50 clamped by the pair of clamping bodies 32 and 34 are inserted into the attachment hole 102 formed in the attachment panel 100. Specifically, the engagement portion 34 is provided at an intermediate portion in the longitudinal direction of the clamping body 32. Furthermore, the engagement portion 34 is elastically engaged with an edge portion of the attachment hole 102. Moreover, the engagement portion 34 is integrated with the clamping body 32. Specifically, the engagement portion 34 and the clamping body 32 are integrally molded. The engagement portion 34 includes an elastic plate portion 34A and a claw portion 34B. In the elastic plate portion 34A, an end portion of the clamping body 32 on the shaft portion 52 side is supported by the clamping body 32, and an end portion of the clamping body 32 on a side opposite from the shaft portion 52 is a free end. The claw portion 34B is provided at a side of the free end of the elastic plate portion 34A. Furthermore, the claw portion 34B is provided at an outer surface side of the elastic plate portion 34A, that is, on the side opposite from the clamping surface (holding portion 36) of the clamping body 32. When the claw portion 34B is caught by the edge portion of the attachment hole 102, the engagement portion 34 is engaged with the attachment hole 102.

Furthermore, the engagement portion 44 is provided at an intermediate portion in the longitudinal direction of the clamping body 42. Specifically, the engagement portion 44 is disposed at a position facing the engagement portion 34 in a state in which the pair of clamping bodies 32 and 34 is closed. Furthermore, the engagement portion 44 is elastically engaged with the edge portion of the attachment hole 102. Moreover, the engagement portion 44 is integrated with the clamping body 42. Specifically, the engagement portion 44 and the clamping body 42 are integrally molded. The engagement portion 44 includes an elastic plate portion 44A and a claw portion 44B. In the elastic plate portion 44A, an end portion of the clamping body 42 on a side of the bearing portion 54 is supported by the clamping body 42, and an end portion of the clamping body 42 on a side opposite from the bearing portion 54 is a free end. The claw portion 44B is provided at a side of the free end of the elastic plate portion 44A. Furthermore, the claw portion 44B is provided at an outer surface side of the elastic plate portion 44A, that is, on the side opposite from the clamping surface (holding portion 46) of the clamping body 42. When the claw portion 44B is caught by the edge portion of the attachment hole 102, the engagement portion 44 is engaged with the attachment hole 102.

Furthermore, the grommet 30 of the present embodiment further includes insertion prevention portions 70 and 72, a first locking portion 80, and a second locking portion 82.

(Insertion Prevention Portions 70 and 72)

Figure 12:
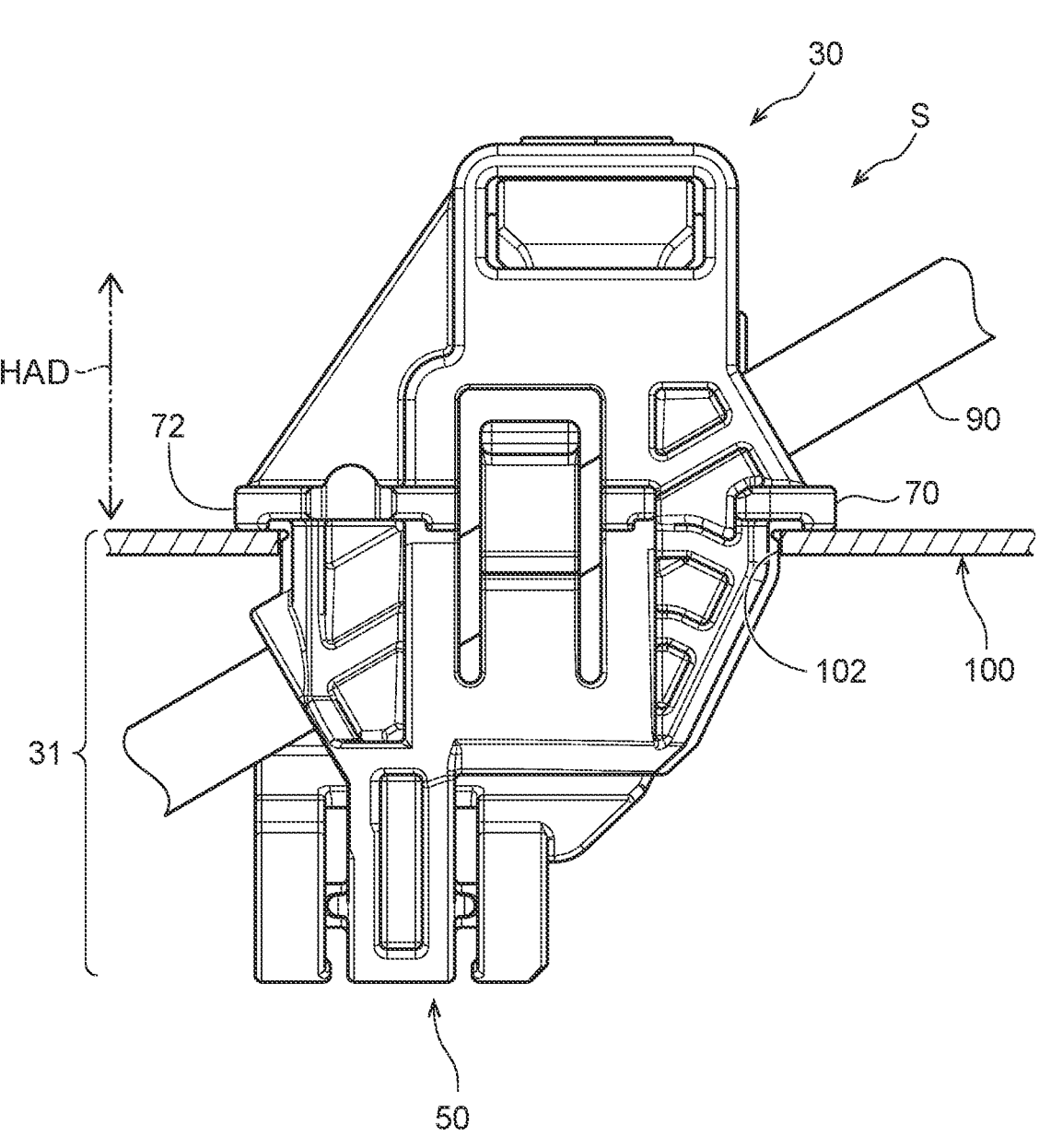
FIG. 12 is a side view of the grommet illustrated in FIG. 11.
Figure 13:
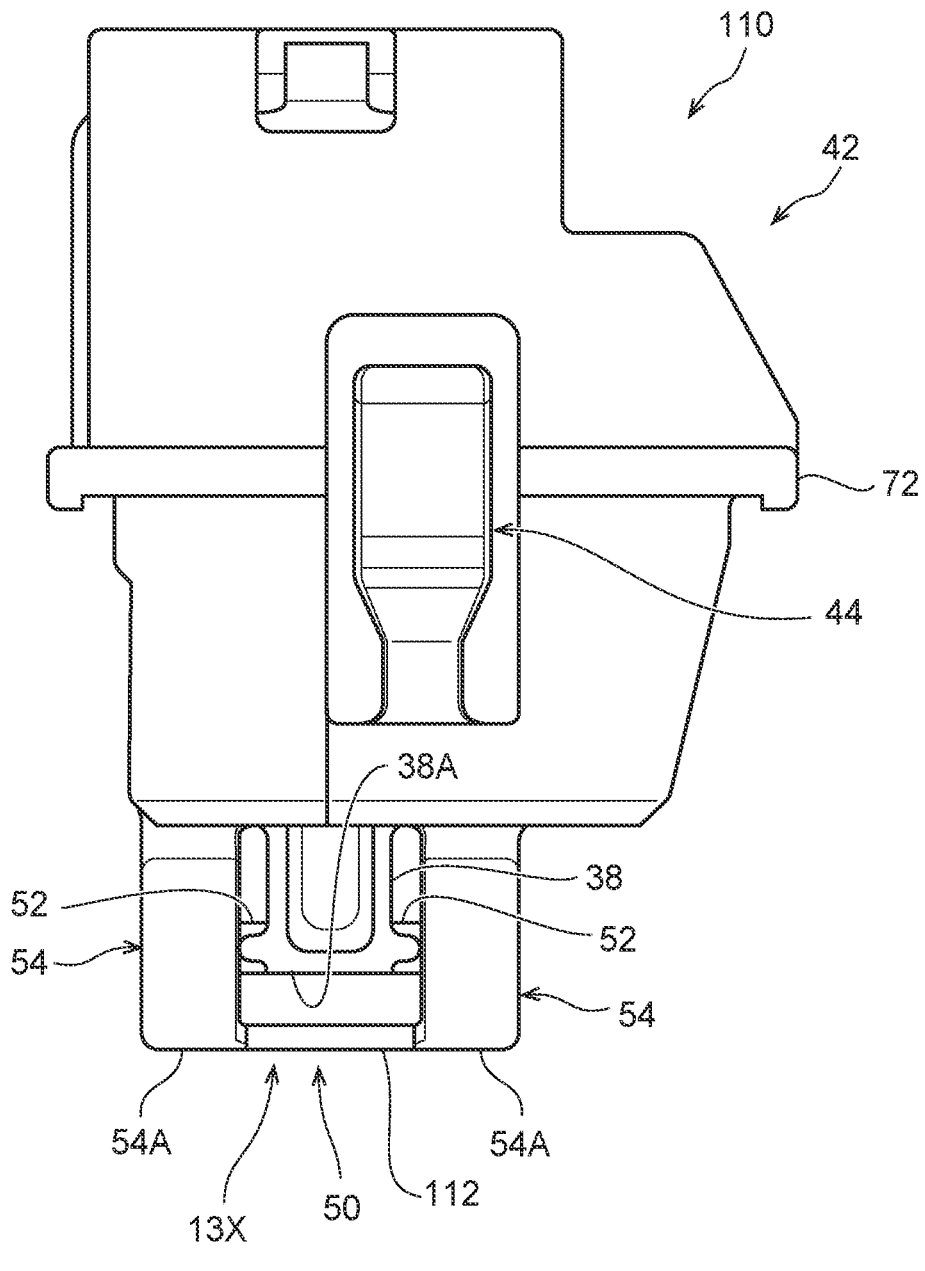
FIG. 13 is a front view of a grommet according to another embodiment.
Figure 14:
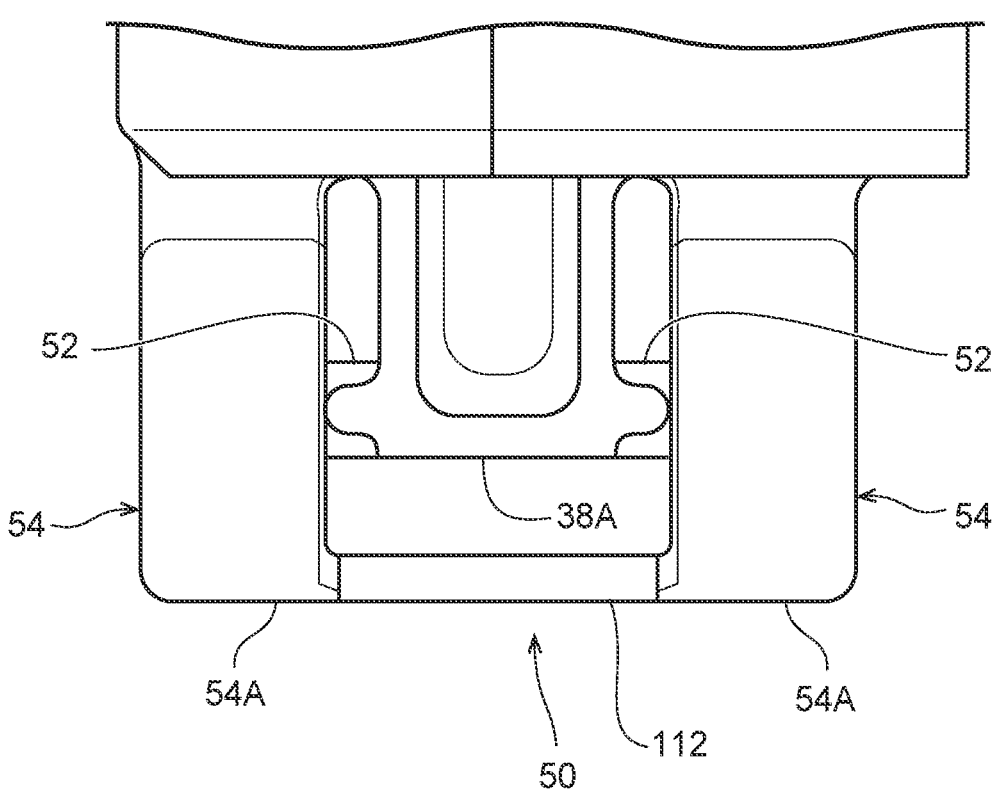
FIG. 14 is an enlarged view of a portion indicated by arrow 14X in FIG. 13.

As illustrated in FIGS. 1, 8, and 12, the insertion prevention portions 70 and 72 are portions serving as insertion prevention portions when the pair of clamping bodies 32 and 34 is inserted into the attachment hole 102.

The insertion prevention portions 70 and 72 are provided at the pair of clamping bodies 32 and 34. Specifically, the insertion prevention portions 70 and 72 are provided so as to be brought in contact with the edge portion of the attachment hole 102 on the opposite side of the engagement portions 34 and 44 across the edge portion of the attachment hole 102 in a state in which the pair of clamping bodies 32 and 34 is inserted into the attachment hole 102. More specifically, the insertion prevention portion 70 is provided at the clamping body 32. The insertion prevention portion 70 is a protruding portion protruding in the same direction as the claw portion 34B. The clamping body 32 and the insertion prevention portion 70 are integrated. That is, the clamping body 32 and the insertion prevention portion 70 are integrally molded. The insertion prevention portion 70 is disposed on a side opposite from the engagement portion 34 across the edge portion of the attachment hole 102 in a state in which the pair of clamping bodies 32 and 34 is inserted into the attachment hole 102.

Furthermore, the insertion prevention portion 72 is provided at the clamping body 42. The insertion prevention portion 72 is a protruding portion protruding in the same direction as the claw portion 44B. With the pair of clamping bodies 32 and 34 closed, the insertion prevention portion 72 is disposed at a position opposite to the insertion prevention portion 70. Furthermore, the clamping body 42 and the insertion prevention portion 72 are integrated. That is, the clamping body 42 and the insertion prevention portion 72 are integrally molded. The insertion prevention portion 72 is disposed on a side opposite from the engagement portion 44 across the edge portion of the attachment hole 102 in a state in which the pair of clamping bodies 32 and 34 is inserted into the attachment hole 102.

Note that, in the present embodiment, as illustrated in FIGS. 7 and 8, a range from a distal end portion of the grommet 30 in the insertion direction into the attachment hole 102 to the insertion prevention portions 70 and 72 is a portion of the grommet 30 to be inserted into the attachment hole 102. Hereinafter, the portion of the grommet 30 to be inserted into the attachment hole 102 is indicated by an insertion portion 31.

(First Locking Portion 80 and Second Locking Portion 82)

As illustrated in FIG. 6, the first locking portion 80 and the second locking portion 82 are portions for maintaining a state in which the pair of clamping bodies 32 and 34 is opened.

The first locking portion 80 is provided at the clamping body 32. Specifically, the first locking portion 80 is provided at each of outer peripheral surfaces of the pair of shaft portions 52. More specifically, the first locking portion 80 is a protruding portion protruding radially outward from the outer peripheral surface of the shaft portion 52, and is locked to the second locking portion 82 in a state in which the pair of clamping bodies 32 and 34 is opened.

The second locking portion 82 is provided at the clamping body 42. Specifically, the second locking portion 82 is provided at each of outer peripheral surfaces of the pair of bearing portions 54. More specifically, the second locking portion 82 is a protruding portion protruding from an inner surface of the bearing portion 54 (a surface on an opposing side of the pair of bearing portions 54) toward the opposing bearing portion 54, and is locked to the first locking portion 80 in a state in which the pair of clamping bodies 32 and 34 is opened.

As described above, the first locking portion 80 and the second locking portion 82 are locked to each other in a state in which the pair of clamping bodies 32 and 34 is opened. That is, a state in which the pair of clamping bodies 32 and 34 is opened is maintained by the first locking portion 80 and the second locking portion 82.

Note that, in the present embodiment, each of the clamping body 32 and the clamping body 42 is an integrally molded product of resin.

<Grommet Attachment Structure S>

As illustrated in FIG. 12, a grommet attachment structure S of the present embodiment is a structure in a state in which the grommet 30 is attached to the attachment panel 100. Specifically, the grommet attachment structure S is a structure in a state in which the grommet 30 holding the wire harness 90 is attached in the attachment hole 102 of the attachment panel 100. The grommet attachment structure S includes the attachment panel 100 and the grommet 30 attached to the attachment panel 100.

Next, functions and effects of the present embodiment will be described.

Figure 10:
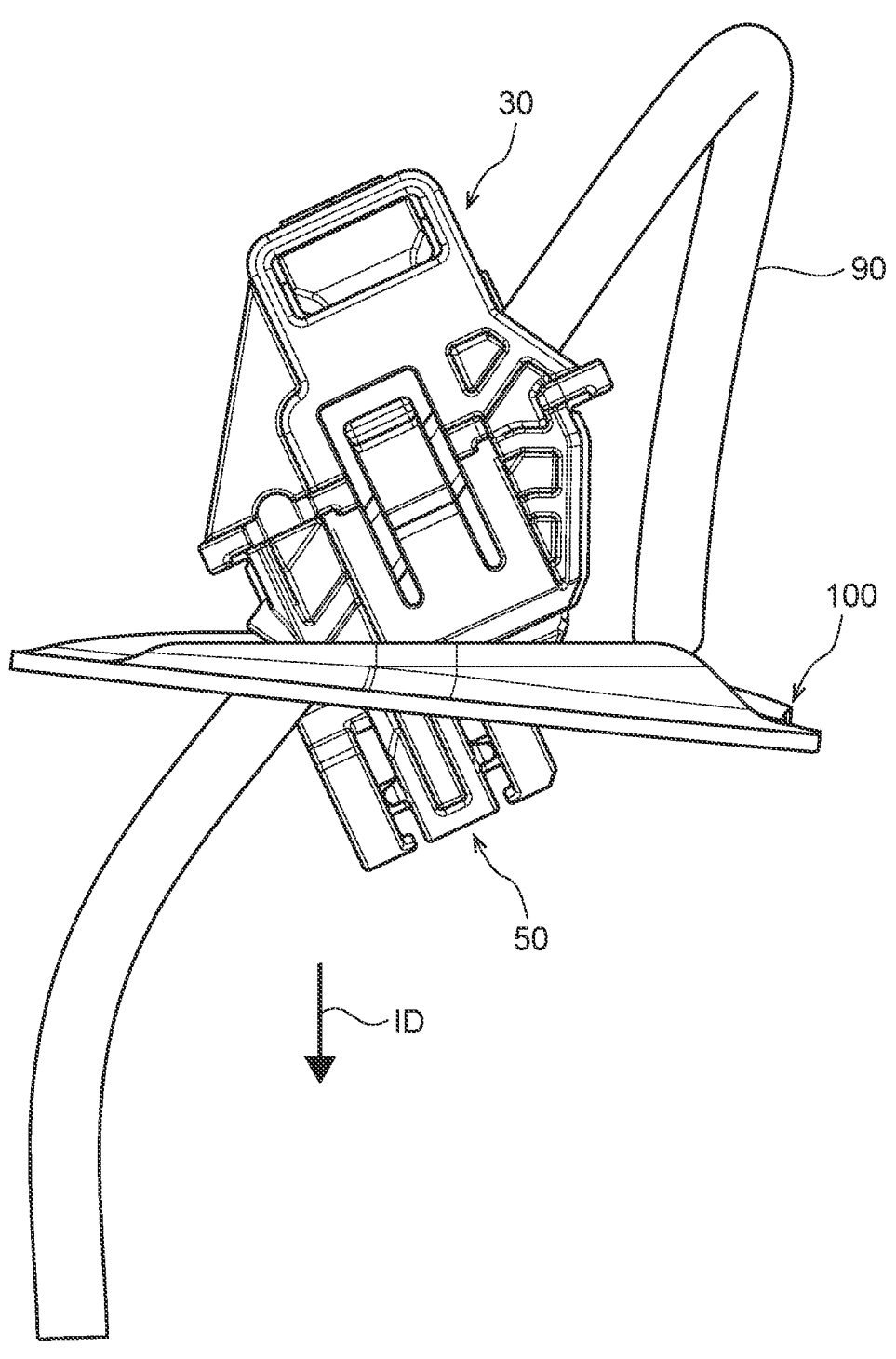
FIG. 10 is a side view illustrating an operation of clamping a wire harness between the pair of clamping bodies of the grommet according to the embodiment of the disclosure and inserting the wire harness into an attachment hole of an attachment panel.
Figure 11:
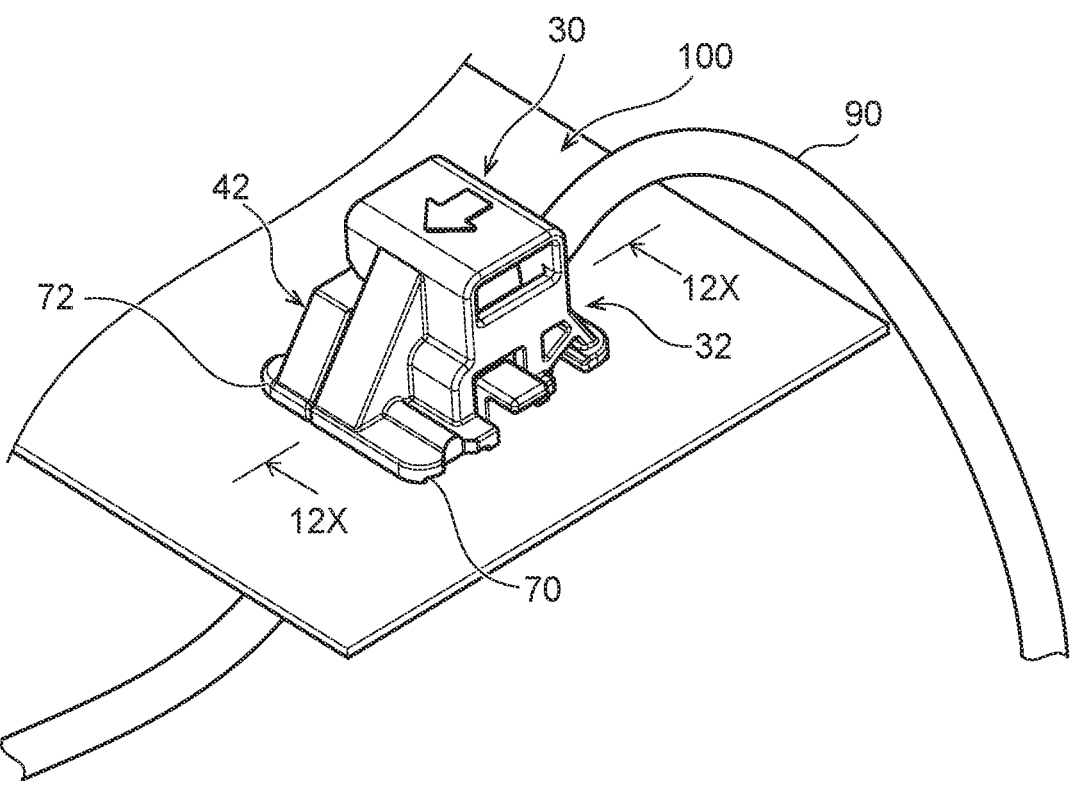
FIG. 11 is a perspective view illustrating a state in which the grommet illustrated in FIG. is attached to the attachment panel.

The grommet 30 of the present embodiment is attached to the attachment panel 100 by engaging the engagement portions 34 and 44 with the attachment hole 102 in a state in which the wire harness 90 clamped between the pair of clamping bodies 32 and 42 and the hinge portion 50 are inserted into the attachment hole 102 (see FIGS. 10 to 12). In a state in which the grommet 30 is attached to the attachment panel 100 in this manner, the hinge portion 50 is located on the back surface side of the attachment panel 100. Therefore, according to the grommet 30 of the present embodiment, it is possible to suppress damage to the hinge portion 50 due to an external force as compared with the case where the hinge portion 50 is located on the front surface side of the attachment panel 100 as in the conventional structure.

In the conventional structure, since the pair of clamping bodies is opened and closed by elastic deformation of the hinge portion coupling the pair of clamping bodies, the hinge portion is formed of a resin material that is easily elastically deformed. In a case where the hinge portion is formed of such a resin material, the hinge portion may be damaged by repeated opening and closing. On the other hand, in the grommet 30 of the present embodiment, the hinge portion 50 is configured by the shaft portion 52 of the clamping body 32 and the bearing portion 54 of the clamping body 42, and the pair of clamping bodies 32 and 42 are coupled so as to be openable and closable by causing the shaft portion 52 of the clamping body 32 to be received by the bearing portion 54 of the clamping body 42. Therefore, in the grommet 30, as compared with the conventional structure, it is possible to suppress damage to the hinge portion 50 even when the pair of clamping bodies 32 and 42 is repeatedly opened and closed.

In the grommet 30 of the present embodiment, since the clamping body 32 and the shaft portion 52 are integrated, and the clamping body 42 and the bearing portion 54 are integrated, for example, the number of parts can be reduced as compared with a configuration in which a pair of clamping bodies and the hinge portion are separated.

In the grommet 30 of the present embodiment, in the hinge portion 50, at least a part of the outer peripheral surface of the plate portion 38 is located at the same position as or at a position protruding from the outer peripheral surface of the bearing portion 54. Therefore, for example, as compared with a configuration in which the outer peripheral surface of the plate portion 38 as the hinge portion 50 is located inside the outer peripheral surface of the bearing portion 54, when the hinge portion 50 is inserted into the attachment hole 102 of the attachment panel 100, it is possible to suppress the inside of the bearing portion 54 from hitting the edge portion of the attachment hole 102. As a result, it is possible to suppress damage to the hinge portion 50 when the grommet 30 is attached to the attachment panel 100.

In the grommet 30 of the present embodiment, since the clamping body 32 and the engagement portion 34 are integrated, and the clamping body 42 and the engagement portion 44 are integrated, for example, the number of parts can be reduced as compared with a configuration in which the clamping body and the engagement portion are separated. Furthermore, in the grommet 30, since the engagement portions 34 and 44 are elastically engaged with the edge portion of the attachment hole 102, a modesty feeling can be obtained when the pair of clamping bodies 32 and 42 is inserted into the attachment hole 102. That is, it is possible to recognize that the engagement portions 34 and 44 are engaged with the edge portion of the attachment hole 102 by the elastic force (repulsive force) when the engagement portions 34 and 44 are engaged with the edge portion of the attachment hole 102.

In the grommet 30 of the present embodiment, since the insertion prevention portions 70 and 72 are provided at the pair of clamping bodies 32 and 42, the insertion prevention portions 70 and 72 are brought in contact with the edge portion of the attachment hole 102 of the attachment panel 100, and thereby, it is possible to suppress the pair of clamping bodies 32 and 42 from being excessively inserted into the attachment hole 102.

Furthermore, in a state in which the pair of clamping bodies 32 and 42 is inserted into the attachment hole 102, the edge portion of the attachment hole 102 is sandwiched between the engagement portion 34 and the insertion prevention portion 70 and between the engagement portion 44 and the insertion prevention portion 72, so that rattling of the pair of clamping bodies 32 and 42 can be suppressed.

In the grommet 30 of the present embodiment, when the pair of clamping bodies 32 and 42 is closed, the wire harness 90 is accommodated and held in the holding portions 36 and 46. Thus, in the grommet 30, the holding portions 36 and 46 can suppress damage to the wire harness 90.

In the grommet 30 of the present embodiment, since the holding portions 36 and 46 are inserted through the attachment hole 102 in a state in which the pair of clamping bodies 32 and 42 is inserted into the attachment hole 102, it is possible to suppress the wire harness 90 from coming into contact with the edge portion of the attachment hole 102.

In the grommet 30 of the present embodiment, since the longitudinal directions of the holding portions 36 and 46 are inclined with respect to the hole axis direction of the attachment hole 102, for example, as compared with a configuration in which the longitudinal directions of the holding portions 36 and 46 and the hole axis direction of the attachment hole 102 coincide with each other, the amount (protrusion height) by which the wire harness 90 protrudes from the attachment panel 100 is reduced, and damage to the wire harness 90 due to an external force can be suppressed. Furthermore, handling of the wire harness 90 is improved.

Furthermore, since the longitudinal direction of the holding portions 36 and 46 is inclined with respect to the hole axis direction of the attachment hole 102, the length of the holding portions 36 and 46 for holding the wire harness 90 is increased by the inclination, and the adjustment width of the holding strength for holding the wire harness 90 can be increased.

In the grommet 30 of the present embodiment, the first locking portion 80 and the second locking portion 82 are locked in a state in which the pair of clamping bodies 32 and 42 is opened, that is, a state where the pair of clamping bodies 32 and 42 is opened is maintained by locking the first locking portion 80 and the second locking portion 82. As described above, according to the grommet 30, the pair of clamping bodies 32 and 42 can be conveyed in an opened state.

Since the attachment panel 100 is a vehicle body panel, the grommet 30 of the present embodiment is attached to the vehicle body panel. In a state in which the grommet 30 is attached to the vehicle body panel as described above, the hinge portion 50 is located on the back surface side of the vehicle body panel. Therefore, according to the grommet 30, as compared with the conventional structure in which the hinge portion 50 is located on the front surface side of the attachment panel 100, it is possible to suppress a flying stone during traveling of an automobile from hitting the hinge portion 50. That is, it is possible to suppress damage to the hinge portion 50 due to an external force.

Other Embodiments

In the grommet 30 of the above-described embodiment, as illustrated in FIG. 9, in the hinge portion 50, at least a part of the outer peripheral surface 38A of the plate portion 38 is located at the same position as or at a protruding portion from the outer peripheral surface 54A of the bearing portion 54, but the disclosure is not limited to this configuration. For example, as in the grommet 110 illustrated in FIGS. 13 and 14, in the hinge portion 50, the outer peripheral surface 54A of the bearing portion 54 may be at a position where the outer peripheral surface 38A of the plate portion 38 protrudes further, and the edge portions of the pair of bearing portions 54 may be coupled by the coupling portion 112. In the grommet 110 having such a configuration, since the edge portions of the pair of bearing portions 54 are coupled by the coupling portion 112 in the hinge portion 50, for example, as compared with a configuration in which the outer peripheral surface 54A of the bearing portion 54 is at a position where the outer peripheral surface 38A of the plate portion 38 protrudes further and the edge portions of the pair of bearing portions 54 are not coupled by the coupling portion 112, when the hinge portion 50 is inserted into the attachment hole 102 of the attachment panel 100, it is possible to suppress the inside of the bearing portion 54 from hitting the edge portion of the attachment hole 102. As a result, it is possible to suppress damage to the hinge portion 50 when the grommet 110 is attached to the attachment panel 100.

In the above-described embodiment, the other end portions in the longitudinal direction of the pair of clamping bodies 32 and 42 are locked by the lock portion 60 including the locking claw 62 and the hook portion 64, but the present disclosure is not limited to the configuration using the locking claw 62 and the hook portion 64 as long as the other end portions of the pair of clamping bodies 32 and 42 in the longitudinal direction can be locked.

Although one embodiment of the disclosure has been described above, the disclosure is not limited to the above, and it is a matter of course that various modifications other than the above can be made without departing from the gist of the present disclosure.

What is claimed is:

1. A grommet, comprising:
a pair of clamping bodies that clamp a wire harness;
a hinge portion that openably and closably couples the pair of clamping bodies; and
an engagement portion that is provided at the pair of clamping bodies and that engages with an attachment hole formed in an attachment panel in a state in which the wire harness and the hinge portion clamped by the pair of clamping bodies are inserted into the attachment hole,
wherein the hinge portion couples end portions of the pair of clamping bodies on a side of a direction of insertion into the attachment hole, and, in a state in which the wire harness is inserted together with the hinge portion into the attachment hole, the hinge portion is located further toward the side of the direction of insertion of the pair of clamping bodies into the attachment hole than the engagement portion.

2. The grommet according to claim 1, wherein the hinge portion includes a shaft portion of one clamping body of the clamping bodies, and a bearing portion that is included in another clamping body of the clamping bodies and that receives the shaft portion.

3. The grommet according to claim 2, wherein:
the one clamping body and the shaft portion are integral with each other, and
the other clamping body and the bearing portion are integral with each other.

4. The grommet according to claim 2, wherein:
the one clamping body includes a plate portion and a pair of shaft portions protruding in a thickness direction from both plate surfaces of the plate portion,
the other clamping body includes a pair of bearing portions that are disposed on both sides of the plate portion in the thickness direction and that receive the pair of shaft portions, and
at least a part of an outer peripheral surface of the plate portion is located at a same position as, or at a position protruding from, an outer peripheral surface of the bearing portions at end portions of the pair of clamping bodies on a side of a direction of insertion into the attachment hole.

5. The grommet according to claim 2, wherein:
the one clamping body includes a plate portion and a pair of shaft portions protruding in a thickness direction from both plate surfaces of the plate portion,
the other clamping body includes a pair of bearing portions that are disposed on both sides of the plate portion in the thickness direction and that receive the pair of shaft portions, and
edge portions of the pair of bearing portions are coupled to each other by a coupling portion at end portions of the pair of clamping bodies on a side of a direction of insertion into the attachment hole.

6. The grommet according to claim 1, wherein:
the clamping bodies and the engagement portion are integrated, and
the engagement portion is elastically engaged with an edge portion of the attachment hole.

7. The grommet according to claim 1, wherein the pair of clamping bodies are provided with an insertion prevention portion that is brought into contact with an edge portion of the attachment hole, on a side opposite from the engagement portion, across an edge portion of the attachment hole, in a state in which the pair of clamping bodies are inserted into the attachment hole.

8. The grommet according to claim 1, wherein the pair of clamping bodies include a holding portion that accommodates and holds the wire harness in a closed state.

9. The grommet according to claim 8, wherein the holding portion is inserted through the attachment hole in a state in which the pair of clamping bodies are inserted into the attachment hole.

10. The grommet according to claim 9, wherein a longitudinal direction of the holding portion is inclined with respect to a hole axis direction of the attachment hole in a state in which the pair of clamping bodies are inserted into the attachment hole.

11. The grommet according to claim 1, further comprising:
a first locking portion provided at one clamping body of the clamping bodies; and
a second locking portion that is provided at another clamping body of the clamping bodies and to which the first locking portion is locked,
wherein the first locking portion and the second locking portion are locked in a state in which the pair of clamping bodies are opened.

12. The grommet according to claim 1, wherein the attachment panel is a vehicle body panel.

13. A grommet attachment structure, comprising:
an attachment panel in which an attachment hole is formed; and
a grommet including: a pair of clamping bodies that clamp a wire harness; a hinge portion that openably and closably couples the pair of clamping bodies; and an engagement portion that is provided at the pair of clamping bodies and that engages with the attachment hole formed in the attachment panel in a state in which the wire harness and the hinge portion clamped by the pair of clamping bodies are inserted into the attachment hole,
wherein the hinge portion couples end portions of the pair of clamping bodies on a side of a direction of insertion into the attachment hole, and, in a state in which the wire harness is inserted together with the hinge portion into the attachment hole, the hinge portion is located further toward the side of the direction of insertion of the pair of clamping bodies into the attachment hole than the engagement portion.

* * * * *